(12) United States Patent
Ito et al.

(10) Patent No.: US 7,663,378 B2
(45) Date of Patent: Feb. 16, 2010

(54) PASSENGER SEAT HAVING OCCUPANT DETECTOR AND SEAT HEATER COVERED WITH WATERPROOF SHEET

(75) Inventors: Hiroyuki Ito, Chita (JP); Tsutomu Kamizono, Nagoya (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 173 days.

(21) Appl. No.: 11/825,838

(22) Filed: Jul. 9, 2007

(65) Prior Publication Data
US 2008/0018143 A1 Jan. 24, 2008

(30) Foreign Application Priority Data
Jul. 19, 2006 (JP) ............................. 2006-196957

(51) Int. Cl.
G01R 27/04 (2006.01)
A47C 7/72 (2006.01)
H05B 1/00 (2006.01)
G08B 21/00 (2006.01)

(52) U.S. Cl. .................. 324/663; 297/180.12; 219/217; 340/667

(58) Field of Classification Search .................. 324/663
See application file for complete search history.

(56) References Cited

U.S. PATENT DOCUMENTS

| | | | |
|---|---|---|---|
| 6,073,998 A * | 6/2000 | Siarkowski et al. .... | 297/180.12 |
| 6,194,692 B1 * | 2/2001 | Oberle ........................ | 219/543 |
| 6,283,504 B1 | 9/2001 | Stanley et al. | |
| 6,290,255 B1 | 9/2001 | Stanley et al. | |
| 6,348,862 B1 | 2/2002 | McDonnell et al. | |
| 6,378,900 B1 | 4/2002 | Stanley et al. | |
| 6,392,542 B1 | 5/2002 | Stanley | |
| 6,445,294 B1 | 9/2002 | McDonnell et al. | |
| 6,517,106 B1 | 2/2003 | Stanley et al. | |
| 6,520,535 B1 | 2/2003 | Stanley et al. | |
| 6,563,231 B1 | 5/2003 | Stanley et al. | |
| 6,577,023 B1 | 6/2003 | Stanley et al. | |
| 6,598,900 B2 | 7/2003 | Stanley et al. | |
| 6,703,845 B2 | 3/2004 | Stanley et al. | |
| 6,825,765 B2 | 11/2004 | Stanley et al. | |
| 6,831,565 B2 | 12/2004 | Wanami et al. | |

(Continued)

FOREIGN PATENT DOCUMENTS

JP 7-60185 * 7/1995

(Continued)

*Primary Examiner*—Jeff Natalini
(74) *Attorney, Agent, or Firm*—Harness, Dickey & Pierce, PLC

(57) ABSTRACT

A passenger seat device includes a detector electrode for detecting occupancy of the seat, a seat heater powered by an on-board electric power source, and a waterproof sheet for preventing water permeated into the seat from reaching the seat heater. Whether the seat is occupied or not is detected based on changes in an impedance coupled to the detector electrode. The impedance is affected by the water if it reaches the seat heater, and a sensitivity of the occupancy detection is adversely affected. A shielding electrode insulated from the detector electrode and disposed between the detector electrode and the seat heater may be provided to reduce an amount of parasitic capacitance formed between the detector electrode and the seat heater. An alternating voltage may be supplied to the detector electrode and the shielding electrode.

6 Claims, 4 Drawing Sheets

U.S. PATENT DOCUMENTS

| | | |
|---|---|---|
| 7,098,674 B2 | 8/2006 | Stanley et al. |
| 7,134,715 B1 * | 11/2006 | Fristedt et al. ......... 297/180.12 |
| 7,205,505 B2 * | 4/2007 | Diemer et al. .............. 219/217 |
| 2005/0128082 A1 | 6/2005 | Stanley et al. |
| 2006/0164254 A1 | 7/2006 | Kamizono et al. |
| 2007/0056957 A1 * | 3/2007 | Diemer et al. .............. 219/549 |
| 2008/0011732 A1 * | 1/2008 | Ito et al. ..................... 219/217 |
| 2008/0017625 A1 * | 1/2008 | Ito et al. ..................... 219/202 |
| 2008/0186192 A1 * | 8/2008 | Yamanaka et al. .......... 340/667 |

FOREIGN PATENT DOCUMENTS

| | | |
|---|---|---|
| JP | 10-147171 | 6/1998 |
| JP | 2002-036929 | 2/2002 |
| JP | 2004-175291 | 6/2004 |

* cited by examiner

PASSENGER SEAT HAVING OCCUPANT DETECTOR AND SEAT HEATER COVERED WITH WATERPROOF SHEET

CROSS-REFERENCE TO RELATED APPLICATION

This application is based upon and claims benefit of priority of Japanese Patent Application No. 2006-196957 filed on Jul. 19, 2006, the content of which is incorporated herein by reference.

BACKGROUND OF THE INVENTION

1. Field of the Invention

The present invention relates to a passenger seat device that includes a detector for detecting whether a seat is occupied and a seat heater covered with a waterproof sheet, and to a method of manufacturing the same.

2. Description of Related Art

JP-A-2003-80989 proposes a device for detecting whether a passenger seat of an automotive vehicle is occupied or not. In this device, a passenger on the seat is detected based on changes in an alternating current electromagnetic field in the vicinity of the seat, particularly at a portion above the seat. This type of the detector is referred to as a capacitance-type detector. The detector includes a transmitting electrode embedded in the seat for forming the electromagnetic field and a receiving electrode embedded in a seat-back. A capacitive impedance between the transmitting electrode and receiving electrode decreases when a passenger occupies the seat. Thus, whether the seat is occupied or not is detected.

The capacitance-type detector described in JP-A-2003-80989 also includes a seat heater embedded in the seat at a position under the transmitting electrode (also referred to as a detector electrode). When both of the seat heater and the detector electrode are embedded in a seat as in this example, the seat heater having a substantially constant potential under alternating current is positioned in the vicinity and under the detecting electrode.

In this detector, there is a problem that an impedance between the detector electrode and the seat heater varies if water permeates into the seat and reaches the seat heater. The permeation of water may be caused by rain entering into a passenger compartment or water spilled on a seat surface. Whether the seat is occupied or not may not be accurately detected if water reaches the seat heater located underneath the detector electrode. The impedance between the detector electrode and the seat heater is considerably lowered by the permeated water because water has a high relative dielectric constant.

SUMMARY OF THE INVENTION

The present invention has been made in view of the above-mentioned problem, and an object of the present invention is to provide an improved seat device having an occupant detector that has a high sensitivity by preventing water permeation to a seat heater embedded in a seat. Another object of the present invention is to provide a method of manufacturing such a seat device.

The passenger seat device according to the present invention includes a detector electrode for detecting an occupant on a seat, seat heater embedded in a seat in parallel to the detector electrode, and a waterproof sheet for preventing water permeated from a seat surface from reaching the seat heater. The occupant on the seat is detected based on changes of an impedance coupled to the detector electrode. The seat heater is heated by supplying electric power from an on-board power source.

A shielding electrode may be disposed between the detector electrode and the seat heater in parallel thereto to suppress a parasitic capacitance formed between the detector electrode and the seat heater. Alternating voltage may be supplied between the detector electrode and the shielding electrode. Preferably, the waterproof sheet is disposed to cover not only an upper surface but also side surfaces of the seat heater to completely prevent water permeation to the seat heater. A resistor member forming the seat heater may be coated with an insulating film to prevent water from reaching the resistor member. An insulating film insulating the detector electrode from the shielding electrode may be used as the waterproof sheet.

According to the present invention, water spilled on the seat surface or entered form an open window into the seat is prevented from reaching the seat heater by the waterproof sheet. If the water reaches the seat heater, an impedance between the detector electrode and the seat heater considerably decreases, and thereby sensitivity in the occupant detection is lowered. By preventing water from reaching the seat heater, the detection sensitivity is maintained at a high level even if water permeates into the seat.

DETAILED DESCRIPTION OF THE PREFERRED EMBODIMENTS

Figure 1:
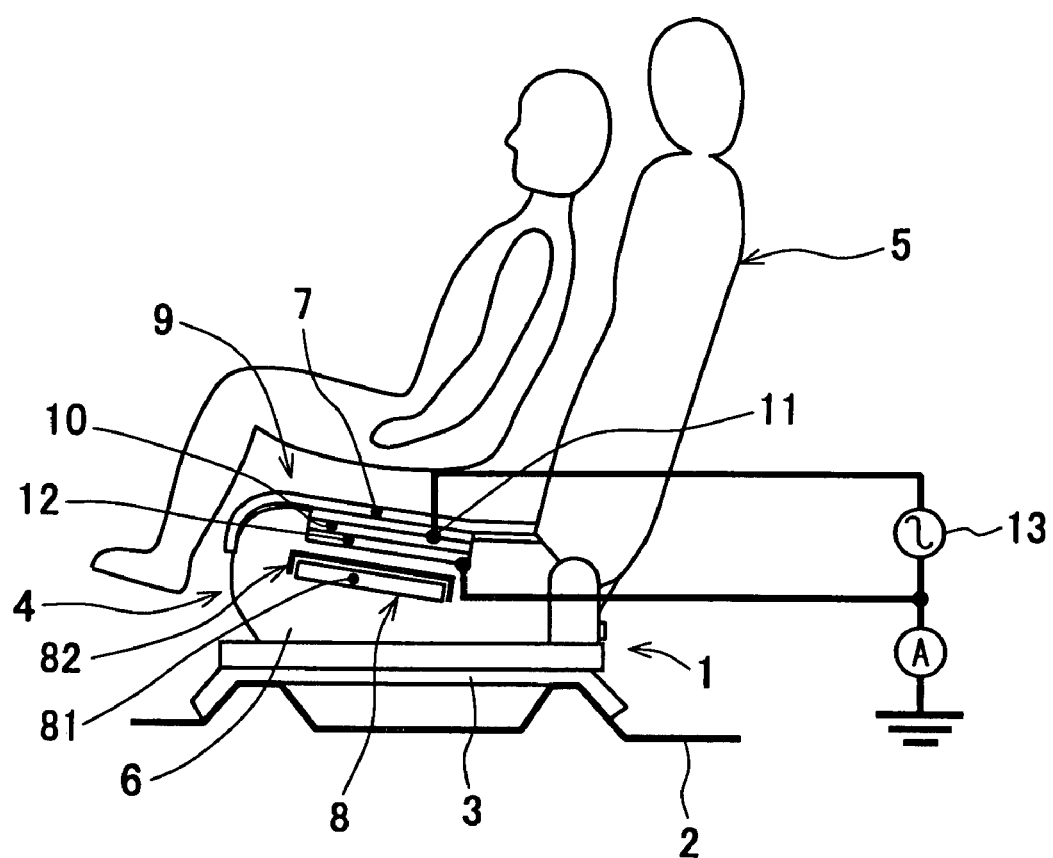
FIG. 1 is a schematic cross-sectional view showing a seat device having an occupant detector according to the present invention.

A first embodiment of the present invention will be described with reference to FIGS. 1 and 2. First, referring to FIG. 1, a seat device 1 having an occupant detector will be described. The seat device 1 is positioned on a metallic frame 3 of a floor 2 of an automotive vehicle. The passenger seat is composed of a seat 4 and a seat-back 5 that supports a passenger's back.

The seat 4 includes a cushion pad 6 made of a material such as hard foam-urethane fixed to the frame 3, a cushion cover 7 covering an upper surface of the cushion pad 6, a seat heater 8 embedded in the cushion pad substantially in parallel to the seat surface, and an electrode unit 9 disposed between the cushion cover 7 and the seat heater 8. The seat heater 8 includes an electric resistor member 81 to which electric power is supplied and a waterproof sheet 82 covering the electric resistor member 81. The electric resistor member 81 is made of a sheet having a plane electric resistor or plural resistor wires, and is disposed substantially in parallel to the seat surface.

The electric resistor member 81 is covered with the waterproof sheet 82 so that water spilled on the seat surface or rain entered into the passenger compartment from an open window does not reach the electric resistor member 81. The waterproof sheet 82 may be made of a resin material having a heat-resistive property. The seat heater 8 may be extended to the seat-back 5. Heating power is supplied to the electric resistor member 81 from a direct current power source such as an on-board battery. It is also possible to heat the electric resistor member 81 with alternating current such as three-phase alternating current generated in an alternator driven by the engine.

The electrode unit 9 is composed of an insulating film 10, an upper electrode 11 disposed on an upper surface of an insulating film 10 and a lower electrode 12 disposed on a lower surface of the insulating film 10. The upper electrode 11 functions as a detector electrode and the lower electrode 12 functions as a shielding electrode. The insulating film 10 may be made of a resin material such as polyethylene-terephthalate (PET) having a thickness of about 1 mm. The electrode unit 9 is disposed immediately underneath the cushion cover 7, and the seat heater 8 is disposed under the electrode unit 9 several millimeters apart therefrom. As a distance between the seat heater 8 and the electrode unit 9 becomes larger, a parasitic capacitance formed between them becomes smaller. However, a distance between the seat surface and the seat heater 8 increases.

Figure 2:
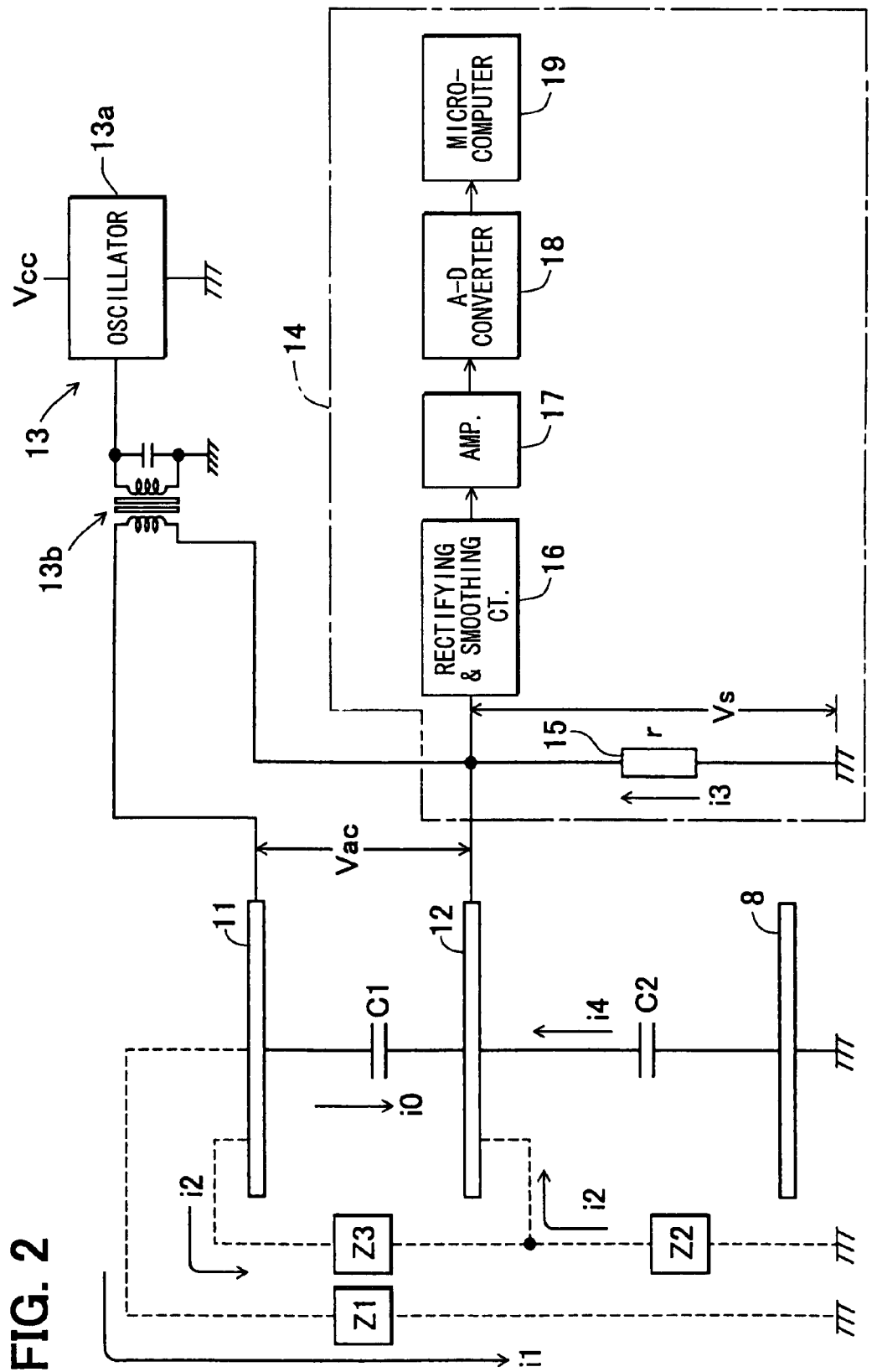
FIG. 2 is a block diagram showing electric connections in the occupant detector as a first embodiment of the present invention.

With reference to FIG. 2, an electric circuit in the seat device 1 will be explained. An alternating voltage (AC-voltage) Vac having a proper frequency, e.g., several tens to several hundreds kHz, is supplied between the upper electrode 11 and the lower electrode 12 from an AC power source 13. The AC power source 13 is composed of an oscillator 13a and an insulating transformer 13b. The electric circuit shown in FIG. 2 is an example, and this may be variously changed.

An occupant detector 14, as shown in FIG. 2, includes a resistor 15 for detecting current flowing therethrough, a rectifying and smoothing circuit 16, an amplifier 17, an analog to digital converter (A-D converter) 18 and a microcomputer 19. An equivalent electric circuit in the seat device 1 when the alternating voltage Vac is supplied between the upper electrode 11 and the lower electrode 12 will be explained with reference to FIG. 2. C1 represents a capacitance between the upper electrode 11 and the lower electrode 12, and C2 represents a capacitance between the lower electrode 12 and the seat heater 8.

The seat heater 8 can be regarded as being substantially grounded (for alternating current). An impedance Z1 is an impedance between the upper electrode 11 and the ground on the vehicle body. The impedance Z1 is substantially a capacitance component, but it includes a small amount of resistance component when a passenger is seated on the seat. An impedance Z2 is an impedance between the lower electrode 12 and the ground. The impedance Z2 is substantially a capacitance component, but it includes a small amount of resistance component when a passenger is seated. The impedances Z1, Z2 change according to occupancy conditions, i.e., whether the seat is occupied or not. An impedance Z3 between the upper electrode 11 and the lower electrode 12 also changes depending on whether the seat is occupied or not.

When the seat is occupied by a passenger, the impedances Z1, Z2 and Z3 decrease. Since the upper electrode 11 is the closest to the occupant, the lower electrode 12 is next to the upper electrode 11, and the seat heater 8 is farthest from the occupant, an amount of impedance decrease in Z1 and Z2 is larger than that in Z3. This means that an amount of current increase in i1 and i2 due to seat occupancy is larger than that in i3. According to impedance decrease in Z1 and Z2, the current i1 and i2 flowing out of the upper electrode 11 increase. This causes an increase in current i3 flowing through the resistor 15, resulting in increase in a voltage drop Vs (=r×i3) across the resistor 15.

The voltage drop Vs is a signal voltage indicating occupancy conditions. The signal voltage Vs is rectified and smoothed in the circuit 16, amplified in the amplifier 17 and converted into a digital signal in the A-D converter 18. The digital signal is fed to the microcomputer 19. The microcomputer 19 determines that the seat is occupied if the digital signal exceeds a predetermined level. It is also possible to determine whether the occupant is an adult or a child, or whether a child seat is positioned on the seat according to the level of the digital signal.

Rain entered into the passenger compartment or water inadvertently spilled on the seat surface may permeate into the seat 4 because the cushion cover 7 is made of a material that allows water to permeate. If the water electrically contacts the seat heater 8, a whole part of the water permeated into the seat 4 becomes a substantially ground level potential. An impedance between the lower electrode 12 and the ground as well as an impedance between the lower electrode 12 and the seat heater 8 is considerably reduced. To prevent the water from contacting the resistor member 81, the resistor member 81 is covered with the waterproof sheet 81. Preferably, side portions of the resistor member 81 are also covered with the waterproof sheet 82 though this is not essential.

Since the seat heater 8 is prevented from being wet, the impedance between the electrode unit 9 (the lower electrode 12, in particular) and the ground or the heat heater 8 is prevented from becoming very low. Thus, accuracy in detecting an occupant is not adversely affected by water permeation. It is preferable to position the waterproof sheet 82 as close as possible to the lower surface of the lower electrode 12 to eliminate a space in which permeated water stays and to thereby prevent changes in the impedance between the lower electrode 12 and the seat heater 8.

Figure 3:
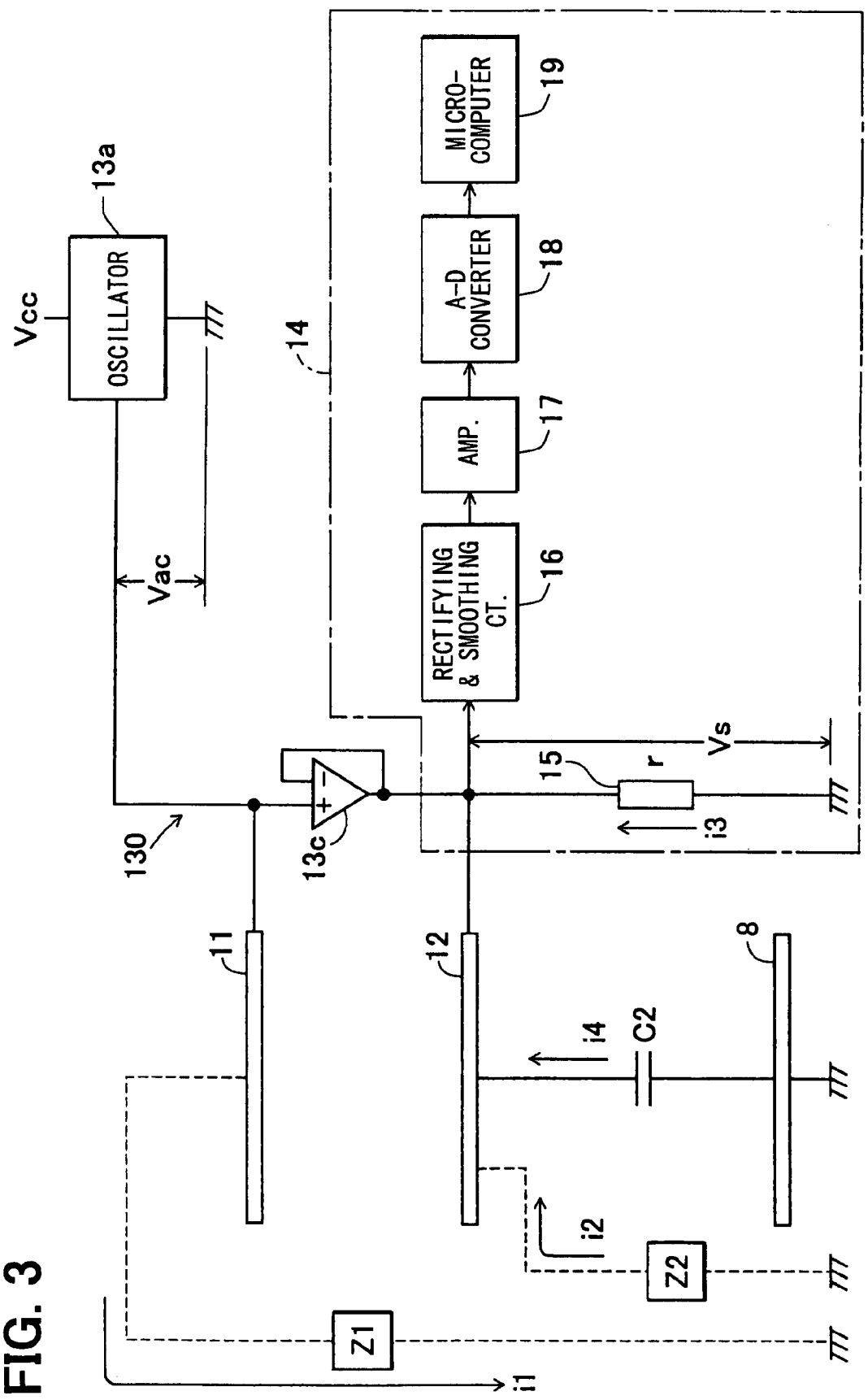
FIG. 3 is a block diagram showing electric connections in the occupant detector as a modified form of the first embodiment of the present invention.

A modified form of the first embodiment of the present invention will be described with reference to FIG. 3. In this embodiment, the alternating power source 13 of the first embodiment is replaced with a power source 130. The power source 130 is composed of an oscillator 13a and a voltage follower circuit 13c. Other structures are the same as those of the first embodiment. An alternating voltage Vac is supplied to the upper electrode 11, and a voltage, which is made substantially equal to the voltage Vac through the voltage follower circuit 13c, is supplied to the lower electrode 12. In this manner, the impedance Z3 can be neglected. When the seat is occupied, the impedance Z1 decreases, causing increase in current i1. The increase in i1 results in increase in i3 and increase in a signal voltage Vs. In the second embodiment, an amount of changes in the signal voltage Vs due to occupancy of the seat can be made larger than that in the first embodiment.

The electric resistor member 81 and the waterproof sheet 82 may be integrally formed. The waterproof sheet 82 may entirely cover the electric resistor member 81. Though the insulating film 10 and the waterproof sheet 82 are made of a thin resin film in the embodiment described above, they may be made of a relatively thick foamed resin material. Since the capacitances between the upper electrode 11 and the lower electrode 12 and between the lower electrode 12 and the electric resistor member 81 become smaller as the insulating film 10 and the waterproof sheet 82 become thicker, the detection sensitivity of the occupant detector can be made higher by making those films 10, 82 thicker. It is possible to make the sheet 82 with a water-permeable material and to make the insulating film 10 with a waterproof material. In this case, it is preferable to cover the side portions of the electric resistor member 81 with the insulating film 10.

Figure 4:
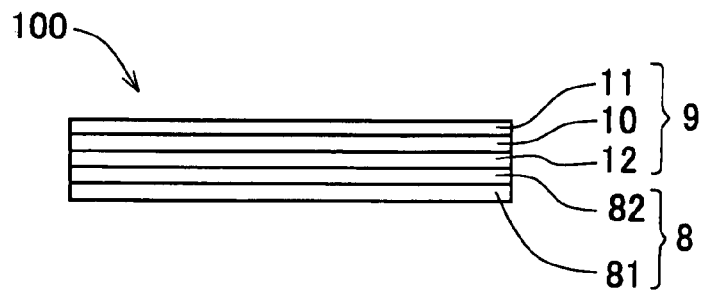
FIG. 4 is a schematic cross-sectional view showing a heater-electrode unit used in the occupant detector as a second embodiment of the present invention.

A second embodiment of the present invention will be described with reference to FIG. 4. In this embodiment, a heater-electrode unit 100 is embedded in the seat. Other structures and functions are the same as those of the first embodiment. The heater-electrode unit 100 includes: the electrode unit 9 composed of the upper electrode 11, the insulating film 10 and a lower electrode 12; and a seat heater 8 composed of the electric resistor member 81 and the waterproof sheet 82. All of these components are integrally formed in the heater-electrode unit 100 as a single body. By integrally forming the heater-electrode unit 100 and then embedding it into the cushion, the seat 4 can be easily manufactured. It is preferable to use a material having a lower relative dielectric constant as the insulating film 10 and the waterproof sheet 82.

Figure 5:
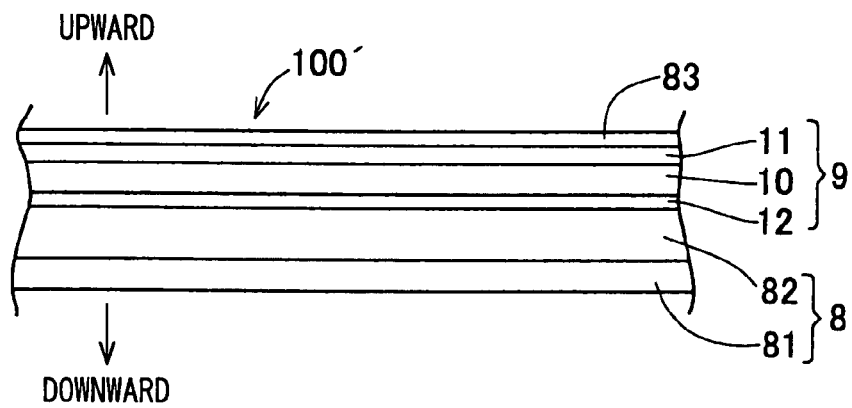
FIG. 5 is a schematic cross-sectional view showing, in an enlarged scale, a heater-electrode unit used in the occupant detector as a third embodiment of the present invention.

A third embodiment of the present invention will be described with reference to FIG. 5. In this embodiment, an integrally formed heater-electrode unit 100' includes another waterproof sheet 83 covering the upper surface of the upper electrode 11. In this case, it is not necessary to make the sheet 82 covering the electric resistor member 81 with a waterproof material. Other structures are the same as those of the second embodiment.

Figure 6:
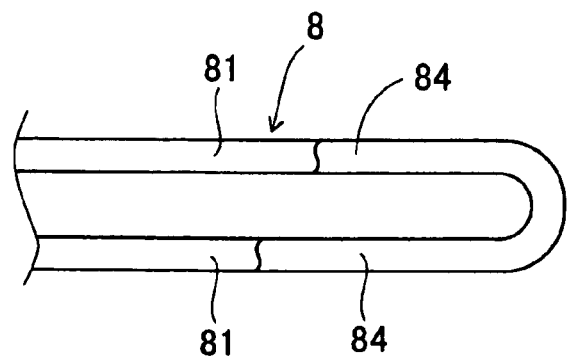
FIG. 6 is a schematic view showing an electric resistor member used in the seat heater, the electric resistor member being covered with an insulating film, as a fourth embodiment of the present embodiment.

A fourth embodiment of the present invention is shown in FIG. 6. In this embodiment, the electric resistor member 81 forming the seat heater 81 is directly coated with a heat-resistive insulating film 84 such as polyimide resin. In this case the waterproof sheet 82 may be eliminated. Other structures are the same as those of the first embodiment.

The present invention is not limited to the embodiments described above, but it may be variously modified. For example, though the load of the alternating voltage source is formed as a resistance-capacitance circuit (CR circuit) in the foregoing embodiments, it is possible to form the load as a circuit including an inductance (LCR circuit). The inductance may be formed by a coil connecting the upper electrode 11 to the lower electrode 12. In the LCR circuit, a larger change in the signal voltage Vs can be obtained at a vicinity of a series or parallel resonant frequency. It is also possible to constitute the detector electrode by a pair of electrodes and position one electrode in the seat and another one in the seat-back.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A passenger seat device for an automotive vehicle, comprising:
    a seat heater embedded in a seat in parallel to a seat surface, electric current being supplied to the seat heater in a controlled manner from an on-board power source;
    a detector electrode embedded in the seat above the seat heater in parallel thereto;
    an alternating current power source for supplying an alternating voltage having a predetermined frequency to the detector electrode; and
    a detector for detecting occupancy conditions of the seat based on changes in an equivalent impedance coupled to the detector electrode, wherein:
    the seat surface is covered with a water-permeable cover;
    the seat heater is protected with a waterproof sheet to prevent water permeated from the seat surface from reaching the seat heater; and
    a shielding electrode positioned between the detector electrode and the seat heater substantially in parallel thereto and an insulating film positioned between the detector electrode and the shielding electrode in parallel thereto, wherein the insulating film also functions as the waterproof sheet.

2. The passenger seat device as in claim 1, wherein the waterproof sheet is extended to outsides of the seat heater.

3. The passenger seat device as in claim 1, wherein the waterproof sheet is extended to outsides of the detector electrode.

4. The passenger seat device as in claim 1, wherein the waterproof sheet is integrally formed with an electric resistor member constituting the seat heater to cover a surface of the electric resistor member, the electric resistor member being made of a plane sheet or a plurality of wires.

5. The passenger seat device as in claim 1, wherein:
    the alternating voltage is supplied between the detector electrode and the shielding electrode.

6. A method of manufacturing the passenger seat device defined in claim 1, the method comprising:
    forming a unit integrally including the detector electrode, the waterproof sheet and the seat heater; and
    then assembling the unit into the seat.

* * * * *